(12) United States Patent
Choi et al.

(10) Patent No.: US 12,511,072 B2
(45) Date of Patent: Dec. 30, 2025

(54) STORAGE DEVICE AND AN OPERATING METHOD OF A STORAGE CONTROLLER

(71) Applicant: Samsung Electronics Co., Ltd., Suwon-si (KR)

(72) Inventors: Wan-Soo Choi, Suwon-si (KR); Sang Hoon Yoo, Suwon-si (KR); Young Sun Youn, Suwon-si (KR); Young Ick Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/417,297

(22) Filed: Jan. 19, 2024

(65) Prior Publication Data

US 2024/0264766 A1 Aug. 8, 2024

(30) Foreign Application Priority Data

Feb. 2, 2023 (KR) ................. 10-2023-0014139
Dec. 22, 2023 (KR) ................. 10-2023-0189973

(51) Int. Cl.
*G06F 3/06* (2006.01)

(52) U.S. Cl.
CPC .......... *G06F 3/0655* (2013.01); *G06F 3/0604* (2013.01); *G06F 3/064* (2013.01); *G06F 3/0679* (2013.01)

(58) Field of Classification Search
CPC ...... G06F 3/0655; G06F 3/0604; G06F 3/064; G06F 3/0679
See application file for complete search history.

(56) References Cited

U.S. PATENT DOCUMENTS

| | | | |
|---|---|---|---|
| 7,779,056 | B2 | 8/2010 | Lin |
| 8,842,472 | B2 | 9/2014 | Kim |
| 8,908,431 | B2 | 12/2014 | Shim et al. |
| 9,190,155 | B2 | 11/2015 | Lee et al. |
| 9,558,108 | B2 | 1/2017 | Chang et al. |
| 9,652,381 | B2 | 5/2017 | Higgins et al. |
| 10,162,544 | B2 | 12/2018 | Lee |

(Continued)

OTHER PUBLICATIONS

European Search Report dated Jul. 15, 2024 for corresponding application EP 24155399.9.

(Continued)

*Primary Examiner* — Tracy A Warren
*Assistant Examiner* — Jason M Pinga
(74) *Attorney, Agent, or Firm* — Muir Patent Law, PLLC

(57) ABSTRACT

A storage device and an operating method of a storage controller are provided. The storage device comprises a non-volatile memory device, each including a plurality of physical blocks, the physical block includes a plurality of sub-blocks and a storage controller including a free block list and a victim selectable block list for the plurality of physical blocks. The storage controller configured to check full reusable physical blocks in the free block list and select a head of the checked block when there are not enough free blocks for storing data in response to a write request received from a host. The storage controller further configured to perform a garbage collection based on the victim selectable block list and to transmit an address of the physical block subjected to the garbage collection to the non-volatile memory device together with the write request.

23 Claims, 13 Drawing Sheets

(56) References Cited

U.S. PATENT DOCUMENTS

| | | |
|---|---|---|
| 10,467,133 B2 | 11/2019 | Perlstein et al. |
| 10,901,891 B2 * | 1/2021 | Byun .................. G06F 12/0246 |
| 11,269,767 B2 | 3/2022 | Byun |
| 2008/0104357 A1 * | 5/2008 | Kim .................... G06F 12/0246 |
| | | 711/170 |
| 2019/0286556 A1 | 9/2019 | You et al. |
| 2020/0034287 A1 * | 1/2020 | Hashimoto ........... G06F 3/0604 |
| 2021/0109856 A1 * | 4/2021 | Lee .................... G06F 11/3037 |
| 2022/0237115 A1 * | 7/2022 | Seo .................... G06F 12/0253 |

OTHER PUBLICATIONS

First Office Action dated Aug. 9, 2024 for corresponding application EP 24155399.9.

* cited by examiner

STORAGE DEVICE AND AN OPERATING METHOD OF A STORAGE CONTROLLER

CROSS-REFERENCE TO RELATED APPLICATION

This application claims priority from Korean Patent Application Nos. 10-2023-0014139 filed on Feb. 2, 2023 and 10-2023-0189973 filed on Dec. 22, 2023 in the Korean Intellectual Property Office, and all the benefits accruing therefrom under 35 U.S.C. 119, the contents of which in their entirety are herein incorporated by reference.

BACKGROUND

1. Field of the Invention

Aspects of the present invention relates to a storage device including a non-volatile memory device.

2. Description of the Related Art

As electronic devices having higher speed and lower power consumption become more prevalent, memory devices incorporated in such electronic devices also require rapid read/write operations and low operating voltages. A random access memory (RAM) may be volatile or non-volatile. A volatile RAM loses information stored in a volatile random access memory each time power is removed, whereas a non-volatile random access memory may retain memory contents even when power is removed from the memory.

SUMMARY

Aspects of the present invention provide a storage device having improved storage space efficiency in a non-volatile memory device that includes sub-blocks in a multi-stack structure.

Aspects of the present invention also provide a method of operating a storage controller that may more efficiently utilize a space of the non-volatile memory device, while making an erase operation on the sub-blocks free, at the time of a write operation on the non-volatile memory device including the sub-blocks.

One embodiment of the present invention provides a storage device comprising: a non-volatile memory device, each including a plurality of physical blocks, the physical block includes a plurality of sub-blocks and a storage controller including a free block list and a victim selectable block list for the plurality of physical blocks, configured to control driving of the non-volatile memory device, wherein the storage controller is configured to check full reusable physical blocks in the free block list and select a head of the checked block when there are not enough free blocks for storing data in response to a write request received from a host, and wherein the storage controller is configured perform a garbage collection based on the victim selectable block list and to transmit an address of the physical block subjected to the garbage collection to the non-volatile memory device together with the write request when there are no full reusable physical blocks.

Another embodiment of the present invention provides a storage device comprising: a non-volatile memory device including a plurality of physical blocks divided into a plurality of sub-blocks in a multi-stack structure and a storage controller configured to control driving of the non-volatile memory device, wherein the storage controller comprises, a write module configured to, upon receiving a write request of a host, requests an address of a free block according to the write request, a garbage collector configured to request an address of a victim block for performing a garbage collection and a block manager configured to store a free block list and a victim selectable block list, and select and return a physical block corresponding to a request of the write module or a request of the garbage collector in the free block list or the victim selectable block list.

Other embodiment of the present invention provides a method of operating a storage controller, the method comprising: receiving a write request from a host, checking whether there is a full reusable first physical block that is able to store data requested to be written in a free block list in response to the write request, selecting a first head of a group to which the first physical block belongs to return a free block address including the first head to a non-volatile memory device, when there is a full reusable first physical block, selecting a second head including at least one valid sub-block in the free block list when there is no first physical block, and returning an address of the physical block to which the second head belongs, when it is enough to store the data requested to be written in the physical block to which the second head belongs and transmitting the returned address of the physical block together with the write request to the non-volatile memory device.

However, aspects of the present invention are not restricted to the one set forth herein. The above and other aspects of the present invention will become more apparent to one of ordinary skill in the art to which the present invention pertains by referencing the detailed description of the present invention given below.

DETAILED DESCRIPTION OF THE EMBODIMENTS

A memory device according to some embodiments of the present invention will now be described with reference to FIGS. 1 to 14.

Figure 1:
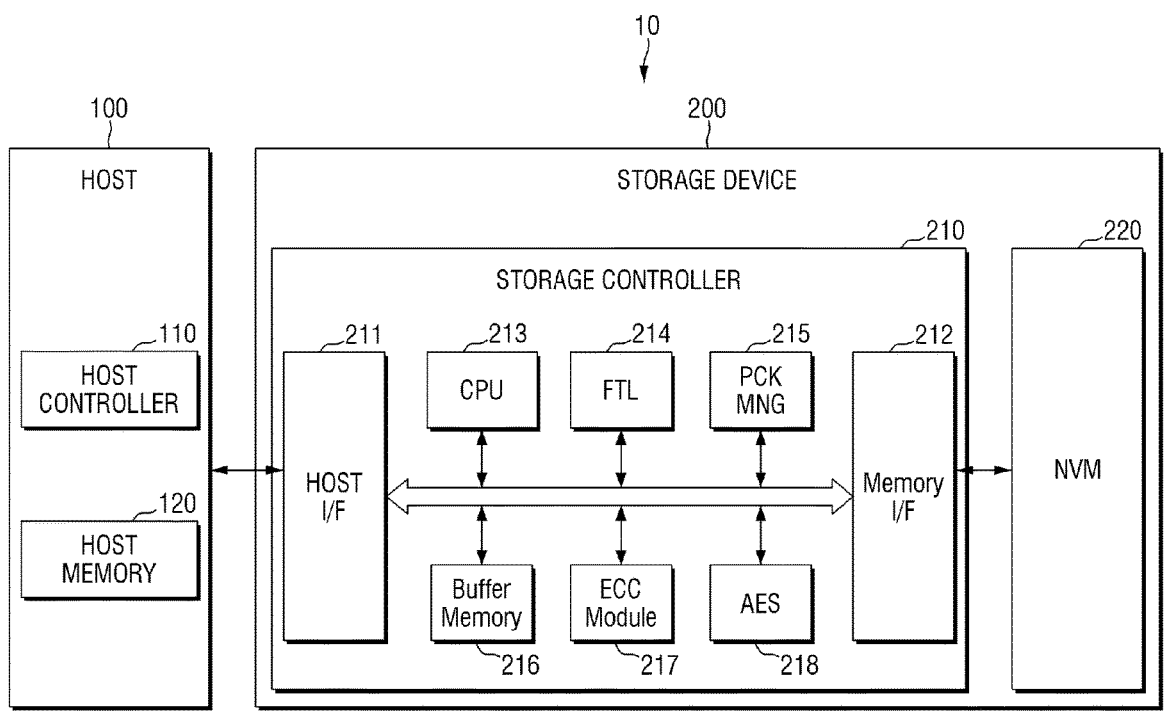
FIG. 1 is a block diagram showing a host-storage system according to an exemplary embodiment of the invention.

FIG. 1 is a block diagram showing a host-storage system according to an exemplary embodiment of the invention.

A host-storage system 10 may include a host 100 and a storage device 200. The storage device 200 may also include a storage controller 210 and a non-volatile memory device (NVM) 220. Additionally, the host 100 may include a host controller 110 and a host memory 120 according to an exemplary embodiment of the present invention. The host memory 120 may function as a buffer memory for temporarily storing data to be transmitted to the storage device 200 or data transmitted from the storage device 200.

The storage device 200 may include storage medium for storing data according to a request from the host 100. As an example, the storage device 200 may include at least one of a solid state drive (SSD), an embedded memory, and a detachable external memory. When the storage device 200 is an SSD, the storage device 200 may be a device conforming to a non-volatility memory express (NVMe) standard. When the storage device 200 is an embedded memory or an external memory, the storage device 200 may be a device conforming to a universal flash storage (UFS) or an embedded multi-media card (EMMC) standard. The host 100 and the storage device 200 may each generate and transmit packets according to the standard protocols adopted.

When the non-volatile memory device 220 of the storage device 200 includes a flash memory, the flash memory may include a 2D NAND memory array or a 3D (or vertical) NAND (VNAND) memory array. As another example, the storage device 200 may include different various types of non-volatile memories. For example, the storage device 200 may include a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), and various other types of memories.

The storage device 200 may be manufactured, for example, in any one form of various types of packages such as PoP (Package on Package), SIP (System in Package), SoC (System on Chip), MCP (Multi Chip Package), CoB (Chip on Board), WFP (Wafer-level Fabricated Package), and WSP (Wafer-level Stack Package).

According to an embodiment, the host controller 110 and the host memory 120 may be implemented as separate semiconductor chips. Further, in some embodiments, the host controller 110 and the host memory 120 may be integrated on the same semiconductor chip. As an example, the host controller 110 may be one of a plurality of modules provided in the application processor, and the application processor may be implemented as a system on chip (SoC). Further, the host memory 120 may be an embedded memory provided inside the application processor, or a non-volatile memory or a memory module placed outside the application processor.

The host controller 110 may manage an operation of storing the data (for example, write data) of the host memory 120 in the non-volatile memory device 220 or storing the data (for example, read data) of the non-volatile memory device 220 in the host memory 120.

The storage controller 210 may include a host interface 211, a memory interface 212, and a CPU (central processing unit) 213. Also, the storage controller 210 may further include a flash translation layer module (hereinafter, a FTL module) 214, a packet manager 215, a buffer memory 216, an ECC module (error correction code, 217) engine, and an AES (advanced encryption standard, 218) engine. The storage controller 210 may further include a working memory (not shown) into which the flash translation layer (FTL) 214 is loaded, and when the CPU 211 executes the flash translation layer, the data write and read operations of the non-volatile memory may be controlled.

The host interface 211 may be connected to the host 100 to transmit and receive packets. The packets transmitted from the host 100 to the host interface 211 may include a command, data to be written in the non-volatile memory device 220, or the like. The packets transmitted from the host interface 211 to the host 100 may include a response to the command, data that is read from the non-volatile memory device 220 or the like. The memory interface 212 may transmit the data to be written in the non-volatile memory device 220 from the storage controller 210 to the non-volatile memory device 220 or receive the data that is read from the non-volatile memory device 220. Such a memory interface 212 may be implemented to comply with standard protocols such as Toggle or ONFI.

The FTL module 214 may perform various functions such as address mapping, wear-leveling, and garbage collection. The address mapping operation is an operation of changing a logical address received from a host into a physical address which is used for actually storing the data in the non-volatile memory device 220. The wear-leveling is a technique for ensuring that blocks in the non-volatile memory device 220 are used uniformly to prevent an excessive degradation of a particular block, and may be implemented, for example, through a firmware technique for balancing the erasure counts of the physical blocks. The garbage collection is a technique for ensuring an available capacity in the non-volatile memory device 220 through a method of copying the valid data of the block to a new block and then erasing the existing block.

The packet manager 215 may generate a packet according to the protocol of the interface discussed with the host 100, or may parse various types of information from the packet received from the host 100. Further, the buffer memory 216 may temporarily store the data to be written in the non-volatile memory device 220 or the data to be read from the non-volatile memory device 220. The buffer memory 216 may be configured to be provided inside the storage controller 210, but may be placed outside the storage controller 210.

The ECC engine 217 may perform error detection and correction functions on the read data that is read from the non-volatile memory device 220. More specifically, the ECC engine 217 may generate parity bits for the write data to be written on the non-volatile memory device 220, and the parity bits thus generated may be stored in the non-volatile memory device 220 together with the write data. When reading the data from the non-volatile memory device 220, the ECC engine 217 may correct an error of the read data, using the parity bits that are read from the non-volatile memory device 220, together with the read data, and may output the read data with a corrected error.

The AES engine 218 may perform at least one of an encryption operation and a decryption operation on the data which is input to the storage controller 210, using a symmetric-key algorithm.

Figure 2:
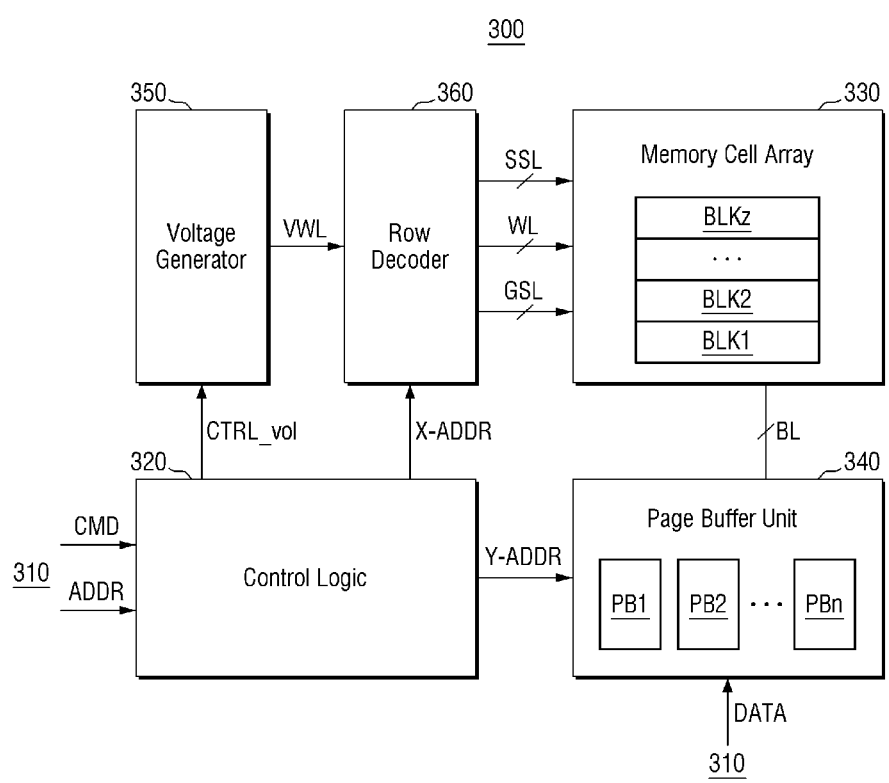
FIG. 2 is an exemplary block diagram showing a memory device.

FIG. 2 is an exemplary block diagram showing a memory device.

Referring to FIG. 2, the memory device 300 may include a control logic circuit 320, a memory cell array 330, a page buffer unit 340, a voltage generator 350, and a row decoder 360. The memory device 300 may further include memory interface circuits 310 and, although not shown in FIG. 2, may further include column logic, a free decoder, a temperature sensor, a command decoder, and address decoders, and the like.

The control logic circuit 320 may provide overall control of various operations inside the memory device 300. The control logic circuit 320 may output various control signals in response to command CMD and/or address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (z is a positive integer), and each of the plurality of memory blocks BLK1 to BLKz may include a plurality of memory cells. The memory cell array 330 may be connected to the page buffer unit 340 through the bit lines BL, and may be connected to the row decoder 360 through word lines WL, string selection lines SSL, and ground selection lines GSL.

In an exemplary embodiment, the memory cell array 330 may include a three-dimensional memory cell array, and the three-dimensional memory cell array may include a plurality of NAND strings. Each NAND string may include memory cells which are each connected to word lines stacked vertically on the substrate. U.S. Pat. Nos. 7,679,133, 8,553,466, 8,654,587, 8,559,235, and U.S. patent Application Publication No. 2011/0233648 are incorporated herein by reference in their entirety. In an exemplary embodiment, the memory cell array 330 may include a two-dimensional memory cell array, and the two-dimensional memory cell array may include a plurality of NAND strings placed along row and column directions.

According to some embodiments, the memory cell array 330 may include a plurality of physical blocks implemented in a multi-stack structure. Each physical block may include a plurality of sub-blocks, for example, divided by stacks. The sub-blocks include a plurality of pages. The physical blocks and the sub-blocks may be units of erase operation, and pages may be units of read or write operation.

In general, the memory cell array 330 does not allow data overwriting. That is, existing data on the same page is not written in place as different data. For example, existing data on a page is not overwritten with new data on the same page. Instead, new data is written to a new page, and the original page becomes an invalid page. Accordingly, each page may be in any one of three states—a free page (writable), a valid page (a state which stores valid data), and an invalid page (a state that does not include valid data any longer (i.e., the page stores invalid data) and cannot be used until erased).

The page buffer unit 340 may include a plurality of page buffers PB1 to PBn (n is an integer of three or more), and each of the plurality of page buffers PB1 to PBn may be connected to the memory cells through a plurality of bit lines BL. The page buffer unit 340 may select at least one bit line among the bit lines BL in response to the column address Y-ADDR. The page buffer unit 340 may operate as a write driver or a sense amplifier, depending on the operating mode. For example, at the time of the write operation, the page buffer unit 340 may apply a bit line voltage corresponding to the data to be written to the selected bit line. At the time of the read operation, the page buffer unit 340 may detect the current or voltage of the selected bit line to detect the data stored in the memory cell.

The voltage generator 350 may generate various types of voltages for performing write, read, and erase operations on the basis of the voltage control signal CTRLvol. For example, the voltage generator 350 may generate a write voltage, a read voltage, a write verification voltage, an erase voltage, and the like, as a word line voltage VWL.

The row decoder 360 may select one of a plurality of word lines WL, and may select one of a plurality of string selection lines SSL in response to the row address X-ADDR. For example, the row decoder 360 may apply the write voltage and the write verification voltage to the selected word line at the time of the write operation, and may apply the read voltage to the selected word line at the time of the read operation.

Figure 3:
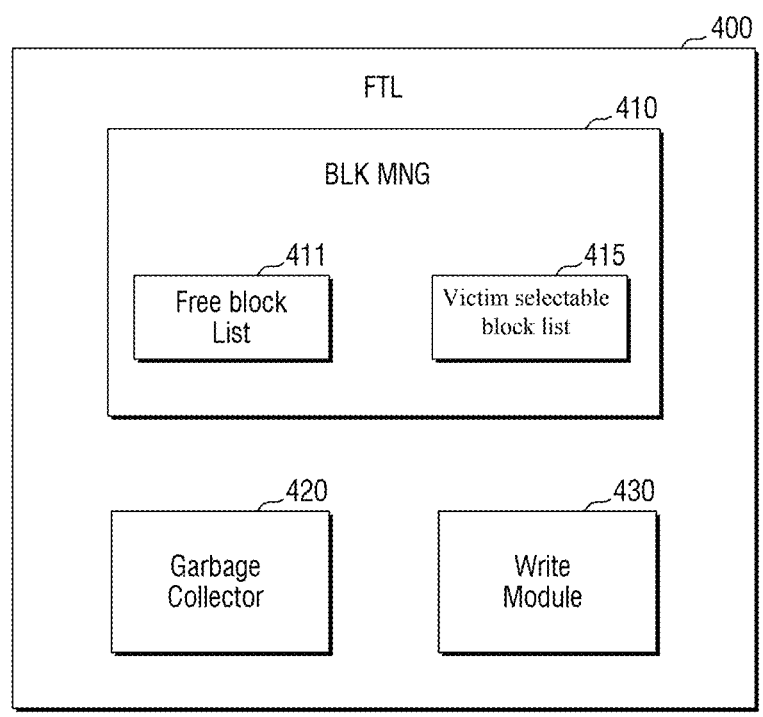
FIG. 3 is a diagram that specifically shows an FTL module 400 according to some embodiments.

FIG. 3 is a diagram that specifically shows an FTL module 400 according to some embodiments.

Referring to FIG. 3, the FTL module 214 of FIG. 1 according to some embodiments may be implemented like the FTL module 400 of FIG. 3. The FTL module 400 may include a block manager 410, a garbage collector 420, and a write module 430.

The block manager 410 may include a free block list 411 and a victim selectable block list 415. The block manager 410 may manage addresses of the physical blocks and the sub-blocks by dividing them into a free block list and a victim selectable block list for address mapping, wear-leveling operations, and garbage collection operations.

The wear-leveling operation counts the number of writes/erases per block, and evenly distributes the degree of degradation among a plurality of blocks.

The garbage collector 420 may rearrange the data on the basis of the wear-leveling state information of the block manager 410. For example, data is rearranged to resolve an increase in invalid pages and invalid sub-blocks due to repeated write/erase operations performed in the non-volatile memory device 220. In the present application, the "valid" page/sub block is a page/sub block including data, the "invalid" page/sub block is a page/sub block having no data.

The garbage collector 420 may perform the garbage collection operation as a background operation related to improvement in data reliability in an arbitrary interval in which user data is not written or read. The garbage collection operation includes moving (i.e., copying) and writing valid pages of a first physical block to a second physical block, and erasing the first physical block to reserve a free block. Additionally, the garbage collection operation includes moving (i.e., copying) and writing valid pages of a first sub-block to a second sub-block, and erasing the first sub-block. In this case, the first physical block and first sub-block from which data is moved (i.e., copied) and subsequently erased as part of the garbage collection operation are called victim blocks. Accordingly, subsequent to the garbage collection operation, the invalid sub-block may be switched to a free sub-block.

The write module 430 may perform an operation of writing data of the host memory 120 to the non-volatile memory device 220 in response to request of the host 100. The write module 430 may write the data to a free block.

The free block may be a physical block including only all invalid sub-blocks or a physical block including at least one valid sub-block, according to some embodiments. However, a block made up of entirely valid sub-blocks is not included in the free block. The free block list may be an address list of the physical block which is sorted and grouped into a first rank (e.g., first group) on the basis of a ratio of the invalid sub-blocks, and sorted into a second rank (e.g., second group) according to the degree of degradation (e.g., erase count) within each group.

The storage controller 210 searches for a free block having a size corresponding to the data requested to be written, and transmits the address of the free block to the non-volatile memory device 220. If the free block includes at least one valid sub-block, the storage controller 210 performs the garbage collection on the valid sub-block to thereby copy the data from the valid sub-block of one physical block to other sub-block of other physical block, and transmits the address to the non-volatile memory device, using the garbage-collected block as a free block.

The victim block may be a sub-block in which data stored in the valid sub-block is moved from and stored in another sub-block. The victim block may include at least one valid sub-block according to some embodiments. However, the block made up entirely of invalid sub-blocks is not included in the victim block. The victim selectable block list may be an address list of physical blocks which are sorted and grouped into a first rank on the basis of the ratio of invalid sub-blocks and sorted into a second rank according to the valid page count within each group.

Figure 4:
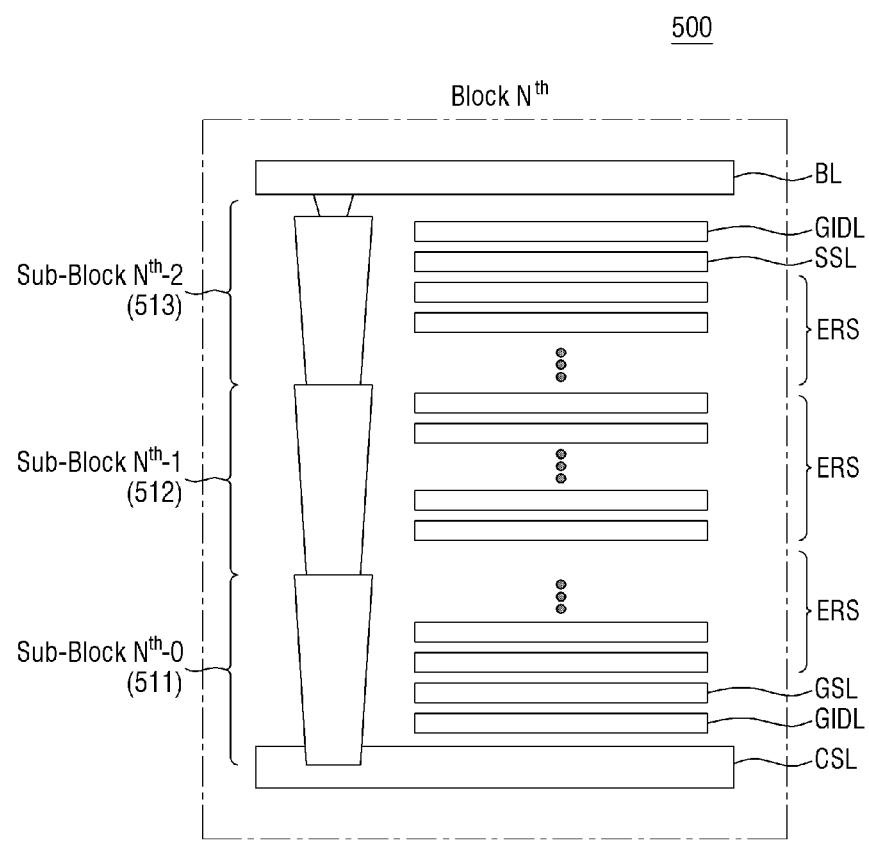
FIG. 4 is a diagram showing one physical block 500 according to some embodiments.

FIG. 4 is a diagram showing one physical block 500 according to some embodiments.

Referring to FIG. 4, the memory cell array 330 of FIG. 2 may include a plurality of physical blocks (BLK) 500. Each physical block may include the plurality of memory cells, and the plurality of memory cells may constitute the plurality of pages. The physical block BLK may include a plurality of sub-blocks. The physical block includes a plurality of metal pads stacked between a common source line CSL and a bit line BL, and the sub-blocks 511, 512, and 513 may divide the stacked metal pads into a predetermined number. In the shown example, an Nth physical block 500 may include three sub-blocks 511, 512, and 513. The sub-block may include two or more pages.

The sub-blocks may be stacked and placed between the common source line CSL placed at the lowermost end of the physical block 500 and the bit line BL placed at the uppermost end thereof. That is, the first sub-block 511 is placed above the common source line CSL, the second sub-block 512 is stacked above the first sub-block 511, and the third sub-block 513 may be stacked above the second sub-block 512 under the bit line BL. In the following exemplary embodiments of the present invention, one physical block is explained to include three sub-blocks. However, the scope of the present invention is not limited thereto, and is also applied to a case where the single block includes two or more sub-blocks.

The sub-blocks may each be managed as a free block list and a victim selectable block list. The free block may be a physical block on which the write operation is performed. According to some embodiments, all the free blocks may include invalid sub-blocks. The physical blocks that include all invalid sub-blocks are reusable after full erasure (Full reusable).

The victim block may be a physical block on which the garbage collection is performed. The victim block may include at least one valid sub-block among a plurality of physical blocks. Alternatively, according to some embodiments, victim blocks may be physical blocks that include only valid sub-blocks.

The free blocks and the victim blocks will be described in more detail in FIGS. 5 and 6.

A non-volatile memory device 330 may write data to and read data from the memory cell array 330 in units of pages. The non-volatile memory device 330 may erase data in units of sub-block or physical block. One or more sub-blocks may be selected at the time of the erase operation, and the selected sub-blocks may erase the data simultaneously or sequentially. The invalid sub-blocks selected by the erase operation may be sub-blocks including only the invalid pages. The sub-blocks included in the victim block may include the same number of pages according to an embodiment, or may include different numbers of pages according to another embodiment.

Figure 5:
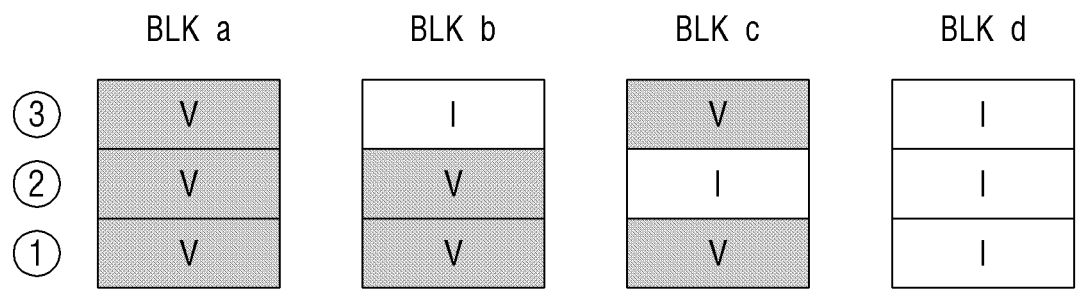
FIG. 5 is a conceptual diagram that simply shows one physical block to explain a data access operation according to some embodiments.

FIG. 5 is a conceptual diagram that simply shows one physical block to explain a data access operation according to some embodiments.

Referring to FIGS. 4 and 5, one physical block includes the plurality of sub-blocks according to some embodiments. Physical blocks (BLK a, BLK b, BLK c, and BLK d) are assumed to include three sub-blocks. A sub-block of a case of including only invalid page on which data is stored and is not writable is represented by I. A sub-block of a case of including at least one valid page is represented by V. That is, the sub-block represented by V may include only valid page, or may include both the valid page and the invalid page.

In a non-volatile memory device based on multi-stack, the read and write operations of data may be performed in units of pages, and the erase operation may be performed in units of sub-blocks. Although there is no restriction on the erase order between the sub-blocks belonging to one physical block at the time of the erase operation, there is a restriction that the order of writing the data between the sub-blocks needs to be observed.

For example, in the case of a physical block (BLK a), since a sub-block ①, a sub-block ②, and a sub-block ③ are all the valid sub-blocks, the block is in a non-writable state, and may be a victim block of the garbage collection, but may not become a writable free block.

For example, in the case of a physical block (BLK b), an uppermost end ③ is an invalid sub-block, but lower sub-block ① and sub-block ② are valid sub-blocks. In this case, it is possible to erase the invalid sub-block ③ by garbage collection and switch the sub-block ③ to a free state.

For example, in the case of a physical block (BLK c), an intermediate sub-block ② is an invalid sub-block, and the uppermost sub-block ③ and the lowermost sub-block ③ are valid sub-blocks. In this case, the uppermost sub-block ③ may be switched to a free block by erasing the sub-block ③ and the intermediate sub-block ② after moving data to a sub-block of another physical block. That is, the physical block (BLK c) needs to perform one data movement and one erase, and therefore further requires a higher management cost than the physical block (BLK b) which performs only one erase.

For example, in the case of the physical block (BLK d), since all sub-blocks ①, ②, and ③ include only invalid pages, and the sub-blocks ①, ②, and ③ may be written in the order after simultaneously erasing and switching to the free block.

In order to overcome such restrictions, even if the storage controller 210 is erased in units of sub-blocks, it may divide a free block of an immediately writable state, a reusable block which is writable after erasing once, and a victim block that enters a writable state after garbage collection for other sub-blocks, sort a writable priority, and manage the blocks. The embodiments of FIGS. 6 to 10 below describe reusable blocks and victim blocks in more detail, with the exception of pure free blocks.

Figure 6:
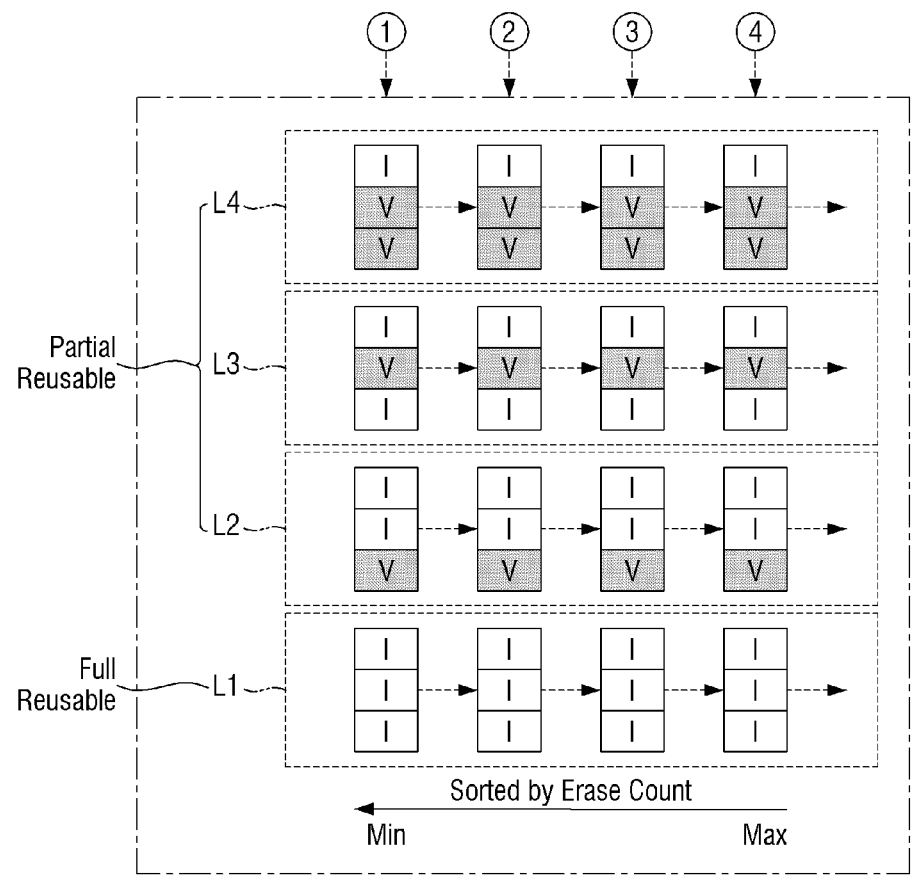
FIG. 6 is a conceptual diagram for explaining a free block list according to some embodiments.

FIG. 6 is a conceptual diagram for explaining a free block list according to some embodiments. A free block list 411 of FIG. 3 may be implemented as shown in FIG. 6.

For example, the block manager 410 sorts and groups the plurality of physical blocks in a first order on the basis of the ratio of invalid sub-blocks I among the plurality of sub-blocks. Alternatively, for example, the block manager 410 sorts and groups the plurality of physical blocks in the first order on the basis of the ratio of valid sub-blocks V among the plurality of sub-blocks. The first order may have a higher priority, for example, as the number of invalid sub-blocks I is large or the number of valid sub-blocks V is small.

The free block list 411 may be a block list that is sorted in a first order of L1, L2, L3, and L4 according to the ratio and position of invalid sub-blocks.

As described in FIG. 5, since the free block has more space for erasing and writing the data as the number of invalid sub-blocks increases, the block manager 410 may determine the physical blocks including only the invalid sub-block (that is, all the three sub-blocks are invalid sub-blocks) as the highest priority L1 (Full Reusable Block).

In the case of the physical blocks including at least one valid sub-block, the block manager 410 may determine the order differently depending on the position of the invalid sub-block (or the position of the valid sub-block) (Partial Reusable Block). The reason is that there is a case where only erase is performed and the block is reusable as a free sub-block depending on the position of the invalid sub-block, and there is a case where erase is performed after moving the data to the garbage collection and the block is reusable as a free sub-block.

For example, in the case of L2, the valid sub-blocks are located at the lowermost end of the physical block, and the invalid sub-blocks are located at the middle and uppermost end of the physical block. In this case, the data of the invalid sub-blocks located at the middle and the uppermost end of the physical block may be erased at the same time.

For example, in the case of L3, the valid sub-blocks are located at the middle of the physical block, and the invalid sub-blocks are located at the lowermost end and the uppermost end of the physical block. In this case, the invalid sub-block located at the uppermost end of the physical block is reusable after erasing. However, the intermediate valid sub-block stores data before the garbage collection and cannot be erased. Even if the physical block includes the same number of invalid sub-blocks as in the embodiments of L2 and L3, the size of the writable sub-blocks differs depending on the position of the invalid sub-blocks. That is, the write priority may be set to be higher depending on the number of sub-blocks that are writable only by the erase.

For example, in the case of L4, the valid sub-blocks are located at the lowermost end and middle of the physical block, and the invalid sub-blocks are located at the uppermost end of the physical block. In this case, the invalid sub-blocks located at the uppermost end of physical blocks may be easily erased. However, it may have the last write priority due to the lower number of reusable sub-blocks compared to groups L1 to L3.

For a plurality of physical blocks L1, L2, L3, and L4 sorted and grouped into a first rank, they may be sorted into a second rank. The second rank may be to be sorted depending on the degree of wear-leveling of the physical blocks. The physical blocks ①, ②, ③, and ④ shown in FIG. 6 may be placed in the sorted order according to wear-leveling including the erase count or the like. Since a block with a smaller erase count is less degraded, the physical blocks ①, ②, ③, and ④ grouped into the first order may be sorted into the second order according to the erase count.

That is, within the same group (for example, group L1) for wear-leveling, since the physical block ① is less degraded than physical block ② on the basis of the erase count, it may have a higher priority.

Figure 7:
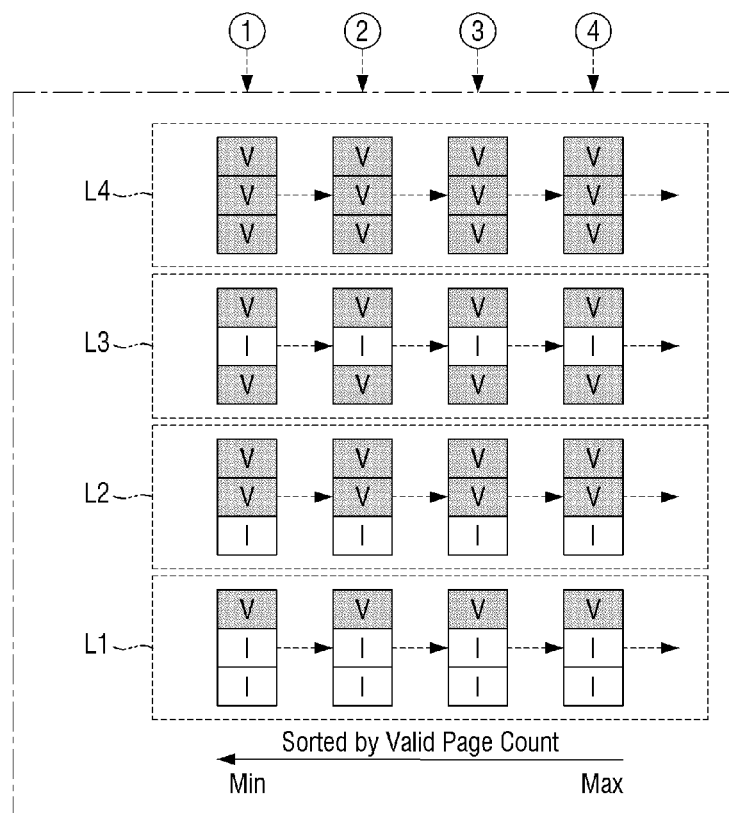
FIG. 7 is a conceptual diagram for explaining a victim selectable block list according to some embodiments.

FIG. 7 is a conceptual diagram for explaining a victim selectable block list according to some embodiments. The victim selectable block list 415 of FIG. 3 may be implemented as in FIG. 7.

The victim selectable block list 415 differs from free block list 411 in that every physical block includes at least one valid sub-block. The victim block refers to a physical block of a case where the block is erased and switchable to a free block after data is moved at least once.

For example, the block manager 410 sorts the plurality of physical blocks in the first order on the basis of the ratio of valid sub-blocks V among the plurality of sub-blocks. Alternatively, for example, the block manager 410 sorts the plurality of physical blocks in the first order on the basis of the ratio of invalid sub-blocks I among the plurality of sub-blocks. The first order may have, for example, a higher priority, as the number of valid sub-blocks V is small or the number of invalid sub-blocks I is large. The victim selectable block list 415 may be a block list sorted in the first order of L1, L2, L3, and L4 depending on the ratio of invalid sub-blocks I and the position of invalid sub-blocks I.

In the victim selectable block list 415, as the number of invalid sub-blocks is large, the more space for writing data by erasing the sub-blocks during the garbage collection operation is secured. Accordingly, as the number of invalid sub-clocks is large, the higher priority of the physical block is set.

For example, physical blocks belonging to the group L1 of the victim selectable block list 415 include two invalid sub-blocks and one valid sub-block, and physical blocks belonging to the Groups L2 and L3 include one invalid sub-block and two valid sub-blocks. Physical blocks belonging to the group L4 includes three valid sub-blocks.

In the case of the group L1, valid sub-blocks are located at the uppermost end of the physical block, and invalid sub-blocks are located at the middle and lowermost end of the physical block. In this case, the invalid sub-blocks located at the middle and the lowermost end of the physical block first move the data of the valid sub-block V located at the uppermost end to another physical block, and then may erase and use all of the lowermost end sub-block, the intermediate sub-block, and the uppermost sub-block.

For example, in the case of the group L2, valid sub-blocks are located at the uppermost end and middle of physical blocks, and invalid sub-blocks are located at the lowermost end of physical blocks. In this case, the invalid sub-block located at the lowermost end of the physical block first moves the data of the valid sub-block V located at the uppermost end and middle of the physical block to other physical blocks, and then may erase and use the full physical block. Since the physical blocks of the group L2 need to be erased after moving the data of the valid sub-blocks V of the second level (uppermost end and middle), the load is greater than the physical blocks of the group L1 that moves only the valid sub-blocks of the first level (uppermost end). Therefore, the group L2 has a lower priority than the group L1 as a victim block.

For example, in the case of the group L3, the valid sub-blocks are located at the uppermost end and lowermost end of the physical blocks, and the invalid sub-blocks are located at the middle of the physical block. In this case, the valid sub-block located at the uppermost end of the physical block may be used, after moving the data to the sub-blocks of other physical blocks and erasing it together with the invalid sub-blocks. However, since the valid sub-block located at the lowermost end of the physical block needs to be erased by moving the data to another physical block after both the uppermost end and intermediate sub-blocks are erased, the load of the garbage collection operation may be greater than the group L2. That is, only the uppermost and intermediate sub-blocks may be written after erasing. The group L3 has a lower priority compared to the group L2 because only two sub-blocks may be reused.

For example, in the case of the group L4, valid sub-blocks are located at the uppermost end, middle, and lowermost end of physical blocks. In this case, the data of the valid sub-block located at the uppermost end of the physical block is moved and erased, then, the data of the valid sub-block located at the middle is moved and erased, and then the data of the valid sub-block located at the lowermost end is moved and erased. That is, the group L4 has the lowest priority because the load of garbage collection operation is greater than the other groups L1, L2, and L3.

A plurality of physical blocks included in the physical blocks L1, L2, L3, and L4 sorted and grouped into the first rank may be sorted into the second rank. The second rank may be to be sorted depending on the valid page count of the physical block. The physical blocks ①, ②, ③, and ④ shown in FIG. 8 may be placed in a sorted order according to the physical block order with good garbage collection efficiency including the valid page count or the like. Since blocks with smaller valid page counts have more invalid pages, the physical blocks L1, L2, L3, and L4 grouped into the first order may be sorted into the second order ①, ②, ③, and ④ in which the valid count gradually increases.

That is, since the physical block ① has fewer valid pages than the physical block ② on the basis of the erase count within the same group (e.g., group L1) to save the cost of garbage collection, it may have a higher priority.

Figure 8:
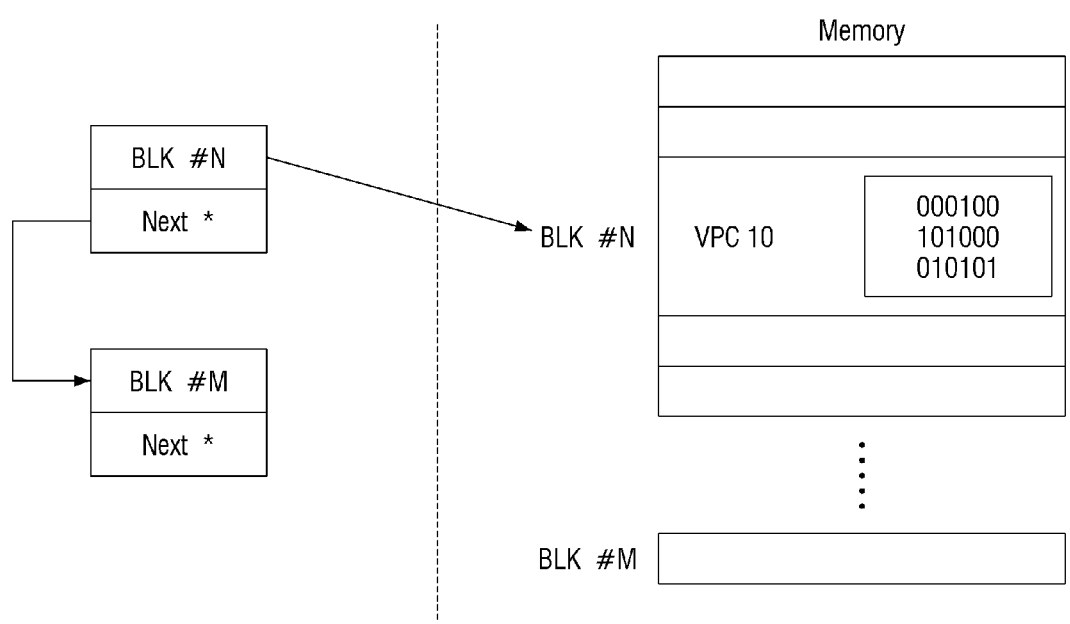
FIG. 8 is a conceptual diagram for explaining a block list stored in an FTL module according to some embodiments.

FIG. 8 is a conceptual diagram for explaining a block list stored in an FTL module according to some embodiments.

Referring to FIG. 8, a free block list 411 and a victim selectable block list 415 may store the plurality of physical block lists in a linked list structure.

Upon receiving a write request from the host, the FTL module 214 first selects a physical block grouped according to the first order in the free block list. The group L1 of FIG. 6 will be described as an embodiment. The FTL module 214 checks the free block information of the physical block in response to a write request. The FTL module 214 first checks a head #N representing the group L1 in the free block list 411, and checks the free block information stored in the first physical block having the head which is #N in the memory. At this time, the memory may be a non-volatile memory included in the block manager 410 of the FTL module 214.

The free block information may include a head (#N) of group, a physical block address, an erase count for sub-block, and a page valid state according to some embodiments. The page valid state may be whether it is a valid page/invalid page and position information of the valid page (or invalid page) according to some embodiments.

The storage device 200 activates the garbage collection operation when the garbage collection operation is required, and the FTL module 214 selects the physical blocks grouped according to the first order of the victim selectable block list. The group L1 of FIG. 7 will be described as an example. The FTL module 214 checks the victim block information of the physical block according to the garbage collection activation. The FTL module 214 first checks the head (#N) representing the group L1 in the victim selectable block list 415, and checks the victim block information stored in the first physical block with the head of #N in the memory. At this time, the memory may be a non-volatile memory included in the block manager 410 of the FTL module 214.

The victim block information may include the head (#N) of the group, the physical block address connected to the head, the valid page count for the sub-block, and the page valid state according to some embodiments. The page valid state may be whether it is a valid page/invalid page and the position information of the valid page (or invalid page) according to some embodiments.

When the FTL module 214 may process the write request in the group L1 (#N) on the basis of the free block information, the FTL module 214 returns the addresses of the sub-blocks included in the physical block of the group L1, and transmits the address of the sub-block related to the write request to the non-volatile memory device 220.

However, when the FTL module 214 cannot process the write request in the group L1 (#N) on the basis of the free block information, the process proceeds to the group L2 (head #M) connected in the order next to the group L1 (#N). head #N and head #M of each group may be, for example, a list connected to the node of the first physical block of the group L2 for the node of the first physical block of the group L1.

Similarly, when the garbage collection may be processed in the group L1 (#N) on the basis of the victim block information, the FTL module 214 returns the addresses of the sub-blocks included in the physical blocks of the group L1, and transmits the addresses of the sub-blocks related to the garbage collection request to the non-volatile memory device 220.

However, when the garbage collection request cannot be processed in the group L1 (#N) on the basis of the victim block information, the process proceeds to group L2 (head #M) connected in the order next to the group L1 (#N). head #N and had #M of each group may be, for example, a list connected to the node of the first physical block of the group L2 for the node of the first physical block of the group L1.

Figure 9:
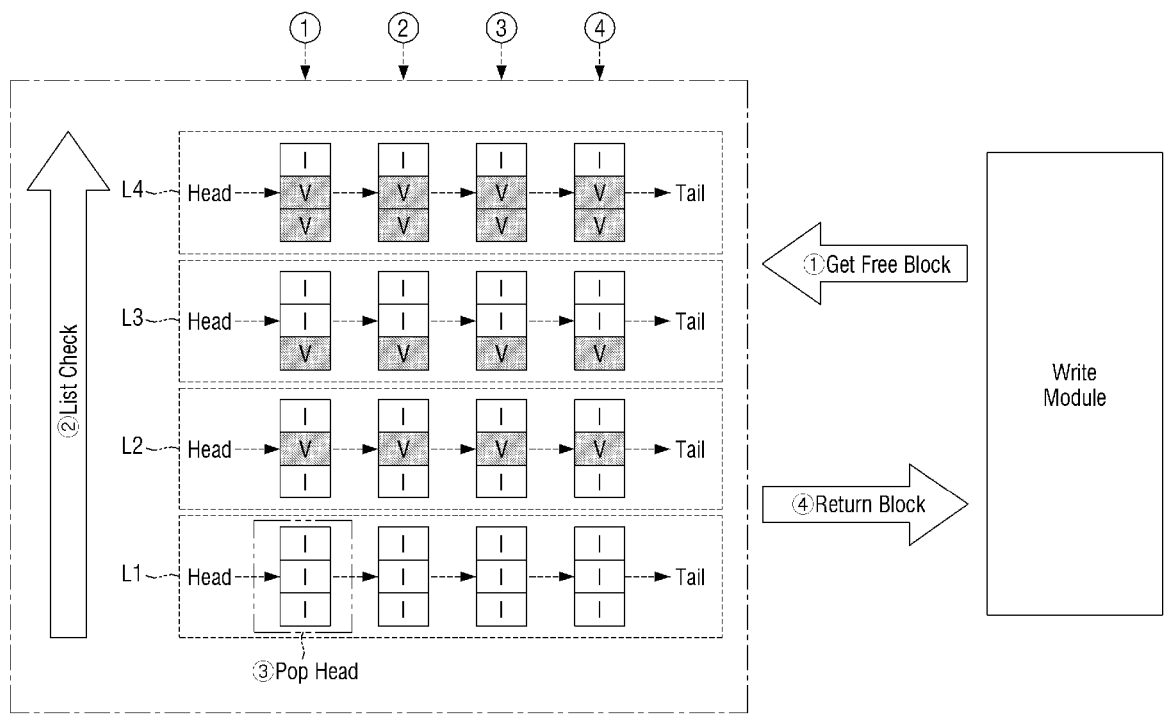
FIG. 9 is a diagram for explaining a write operation of a storage device according to some embodiments.

FIG. 9 is a diagram for explaining a write operation of a storage device according to some embodiments.

Referring to FIG. 9, upon receiving a write request from the host 100, the FTL module 214 searches the logical block-physical block address which processes the write request in the write module 430.

For example, the write module 430 requests a free block address to the block manager 410 (① Get Free Block), and the block manager 410 checks the free block list 411 (② List Check). The block manager 410 checks the head of the group sorted in the first order in the free block list 411 (③ Pop head), and searches for a physical block capable of processing the write request on the basis of the free block information.

If the physical block of the group L1 may process the write request, it returns the address of the physical block and the address of the sub-block determined to be able to process in response to the write request (④ Return Block).

In this way, there is an advantage that the space of the non-volatile memory device can be utilized more efficiently, while making the erase operation on the sub-blocks free, by separately managing free block lists in consideration of inter-sub-block write restrictions (Program sequence), at the time of the write operation on the non-volatile memory device including sub-blocks according to some embodiments. Also, the FTL (File Translation Layer) can be used efficiently by performing the write operation on the basis of the free block list and free block information.

Figure 10:
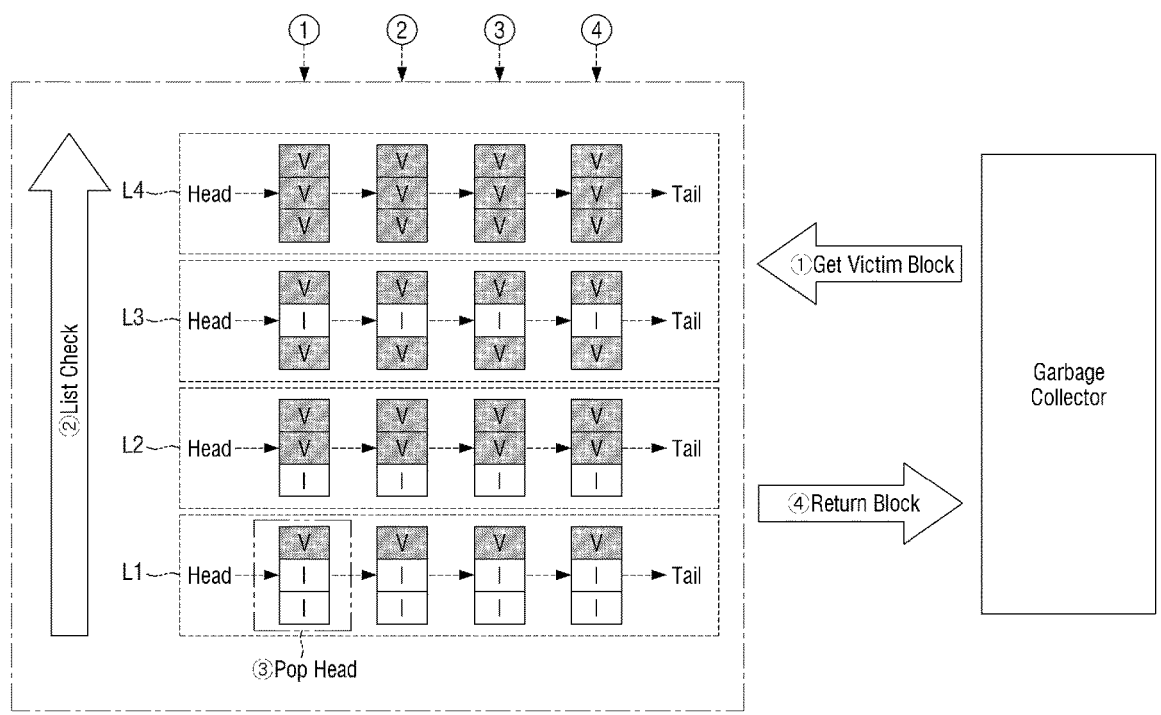
FIG. 10 is a diagram for explaining the garbage collection operation of the storage device according to some embodiments.

FIG. 10 is a diagram for explaining the garbage collection operation of the storage device according to some embodiments.

Referring to FIG. 10, when the garbage collection according to external request or internal determination is activated, the FTL module 214 searches a logical block-physical block address for processing the garbage collection in the garbage collector 420.

For example, the garbage collector 420 requests the victim block address to the block manager 410 (① Get Victim Block), and the block manager 410 checks the victim selectable block list 415 (② List Check). The block manager 410 checks the head of the group sorted in the first order in the victim selectable block list 415 (③ Pop Head), and searches for physical blocks that require the garbage collection on the basis of the victim block information.

If the physical block of the group L1 requires the garbage collection, the address of the physical block and the address of the sub-block determined to require the garbage collection are returned depending on the search result (④ Return Block).

In this way, at the time of the garbage collection operation for a non-volatile memory device including sub-blocks according to some embodiments, by managing the victim selectable block list in consideration of write operation order and erase constraints for sub-blocks, there is an advantage that the cost required to move data can be reduced, while making the erase operation on the sub-blocks free. Also, by performing the garbage collection operations on the basis of the victim selectable block list and victim block information, the FTL (File Translation Layer) can be used efficiently.

Figure 11:
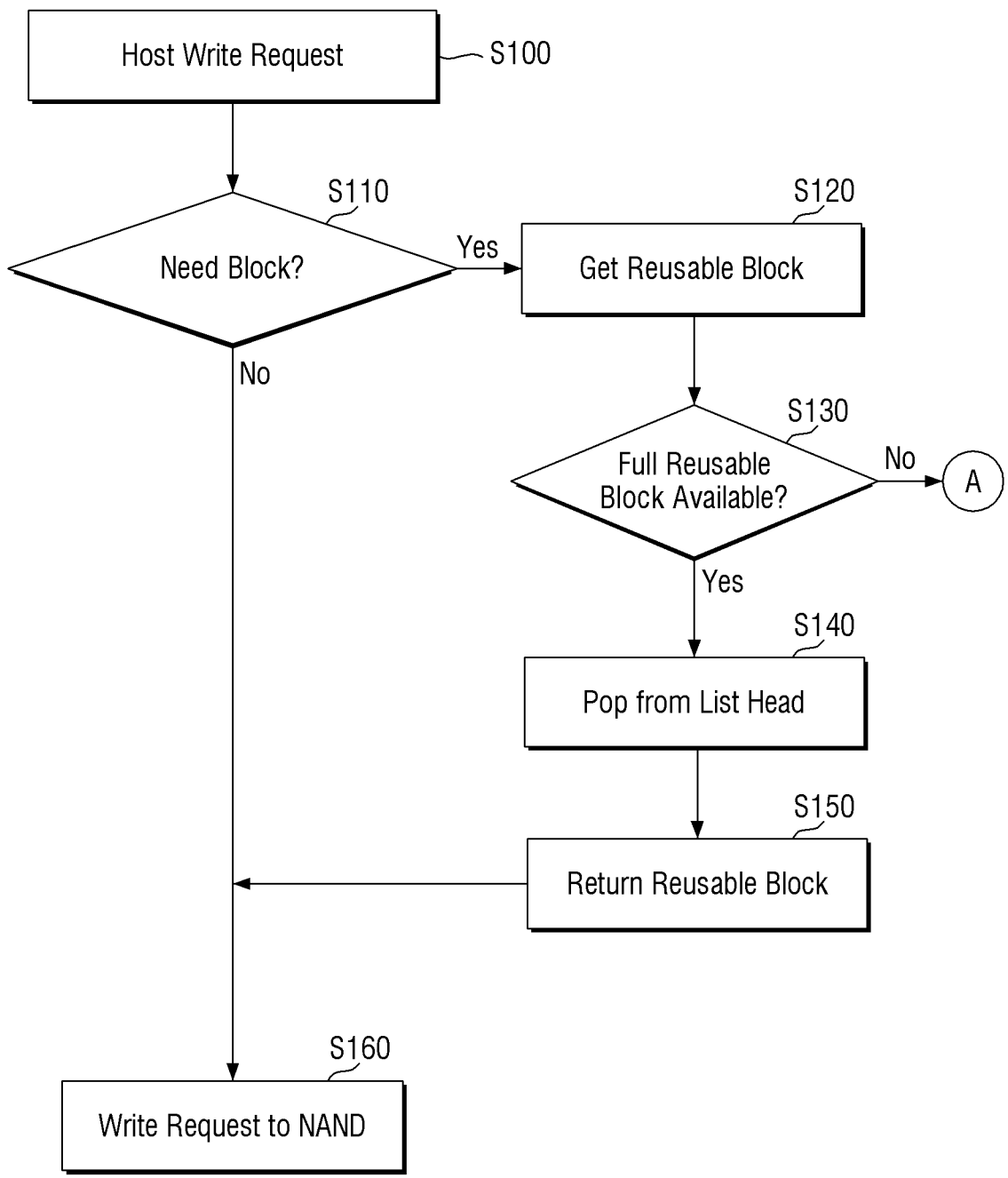
FIGS. 11 to 13 are flow charts for explaining a method of operating a storage device according to some embodiments.
Figure 12:
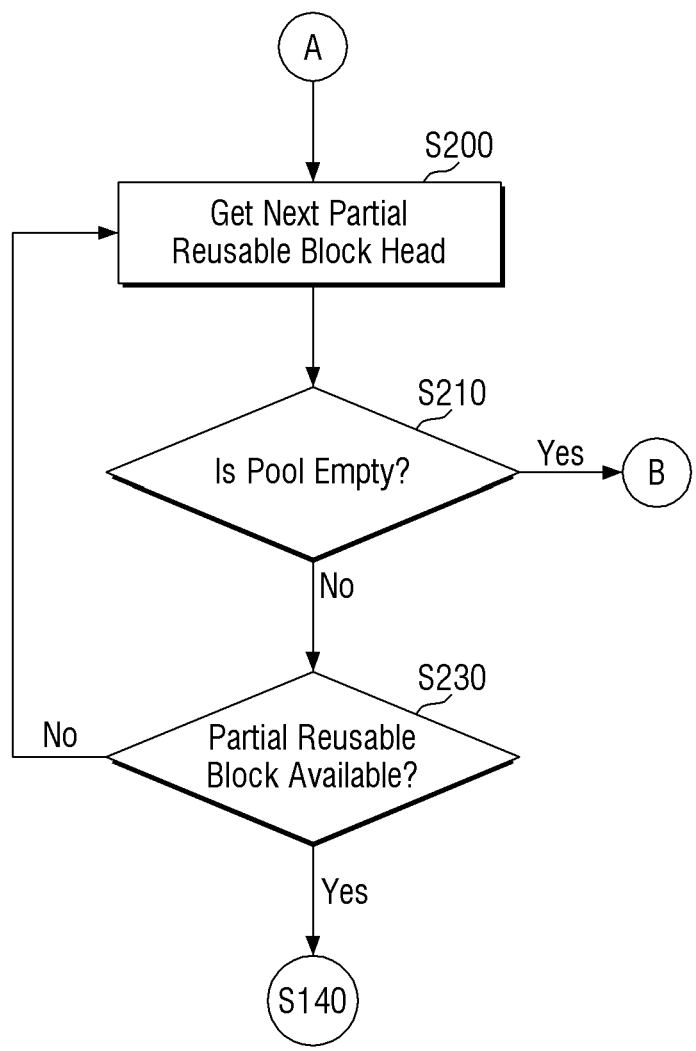
Figure 13:
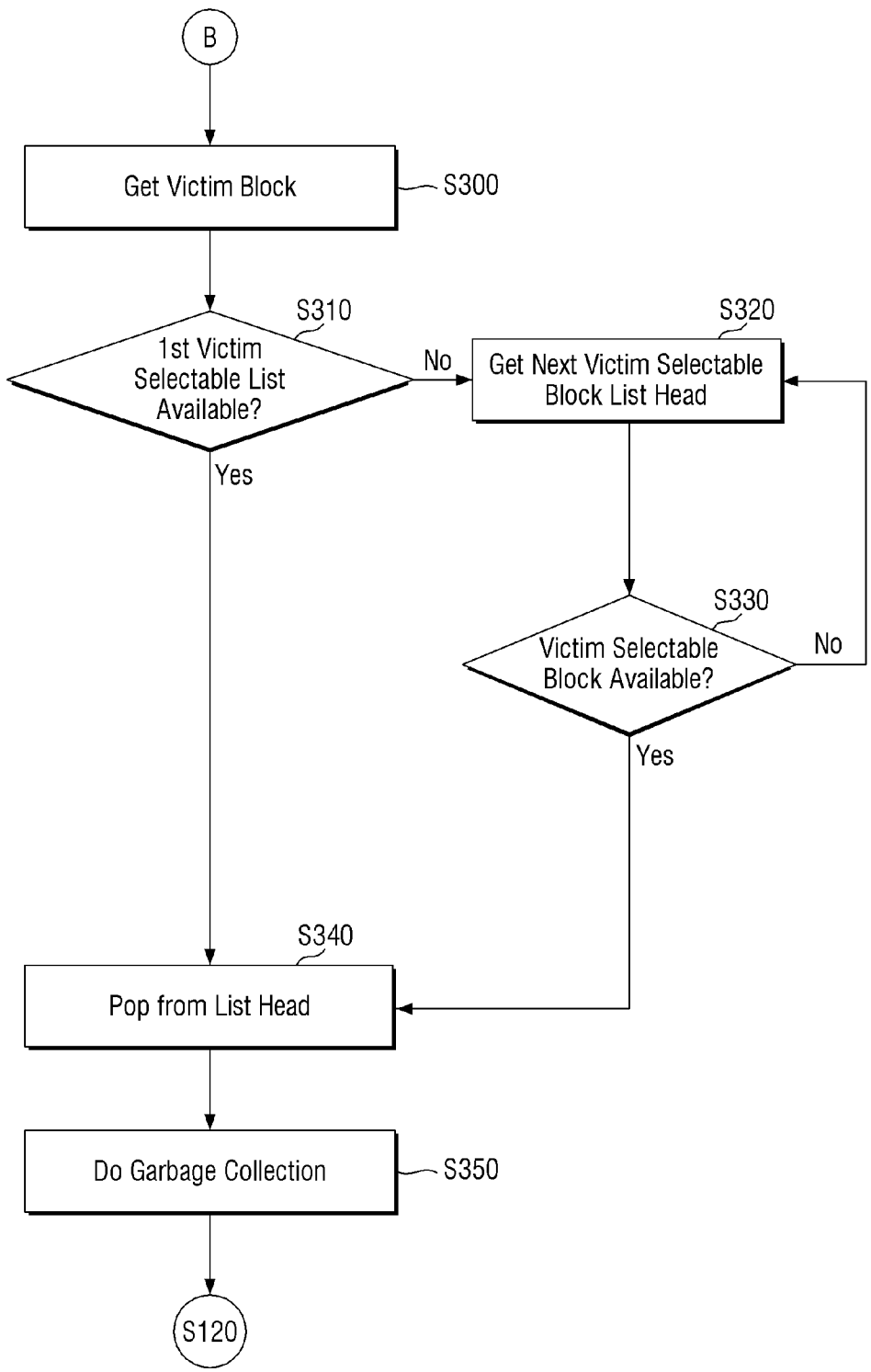

FIGS. 11 to 13 are flow charts for explaining a method of operating a storage device according to some embodiments.

Referring to FIGS. 11 to 13, the storage controller 210 receives a write request from the host 100 (S100). The storage controller 210 checks whether there are free blocks for storing data in the non-volatile memory device 220 according to the write request (S110), and when there are many free blocks in the non-volatile memory device 220, the storage controller 210 transmits the write request to the non-volatile memory device (S160).

However, when there are not enough free blocks to process the write request in the non-volatile memory device 220 (S110, Yes), it requests a reusable free block (S120). The write module 430 obtains addresses of reusable free blocks on the basis of the free block list 411. Specifically, when there is a group that includes only invalid sub-blocks (Full Reusable Block), for example, if it is determined that the write request may be processed in the group L1 of FIG. 6 (S130, Yes), the head of the group L1 is selected (S140). The storage controller transmits the address of the physical block belonging to the group L1 to the non-volatile memory device 220 together with the write request (S150).

On the other hand, if it is not possible to process the write request in a group that includes only invalid sub-blocks (S130, No), it is checked whether a write request is possible in the next group with lower priority. For example, if it is not possible to process the write request in the group L1 of FIG. 6, the storage controller 210 checks the next group L2 according to the list connected in the free block list 411 (that is, if it includes at least one valid sub-block, the partial reusable block) (S200).

If the write request may be processed in the physical block belonging to the group L2 (S210, Yes), since the physical block includes at least one valid sub-block, the storage controller 210 requests a victim block which performs the garbage collection to move the valid sub-block at the minimum cost and replace the invalid sub-block (S300).

The storage controller 210 checks the selectable victim block of first priority in the victim selectable block list to perform the garbage collection (S310). If the garbage collection is possible in the physical block belonging to the group L1 of FIG. 7 (S310, Yes), the head of the group L1 is selected (S340), the garbage collection for moving and erasing the data stored in at least one valid sub-block to the address of the physical block and the sub-block address belonging to the group L1 is performed (S350), and free blocks are requested for the physical blocks of the group L1 in the victim selectable block list 415 for which the garbage collection is completed (S120).

However, if the garbage collection is not possible in the physical block belonging to the group L1 of FIG. 7 (S310, No), it is checked whether the garbage collection is possible in the group of next priority in the victim selectable block list 415 (S320). For example, if the garbage collection is possible in the group L2 having the priority next to the group L1 (S330, Yes), the head of the group L2 is selected (S340), the garbage collection for moving and erasing the data stored in at least one valid sub-block to the address of physical block and sub-block address belonging to the group L2 is performed (S350), and free blocks are requested for the physical blocks of the group L2 in the victim selectable block list 415 for which garbage collection is completed (S120).

Similarly, if the garbage collection is not possible in the physical block belonging to the group L2 of FIG. 7 (S330, No), it is checked whether the garbage collection is possible in the group of next priority in the victim selectable block list 415 (S320).

If there is no empty physical block for processing the write request in the physical blocks belonging to the group L2 (S210, No), it is checked whether the write request is possible in the next group L3 with lower priority (S230).

If the write request may be processed in the group L3 (S230, Yes), the head of the group L3 is selected (S140), and the address of the physical block belonging to the group L3 is returned to the non-volatile memory device 220 (S150).

Since a non-volatile memory device implemented as multi-stack including sub-blocks according to some embodiments has no constraints of sub-block on the erase operation sequences, but has constraints of sub-block on the write operation sequence, the free block list and the victim selectable block list are separately managed in consideration of write constraints on the sub-block. Accordingly, the storage device 200 can efficiently use the space of the non-volatile memory device, and can efficiently use the FTL (File Translation Layer), by writing first to sub-blocks with less load of garbage collection for write operation, while making the erase operation on the sub-block free.

Figure 14:
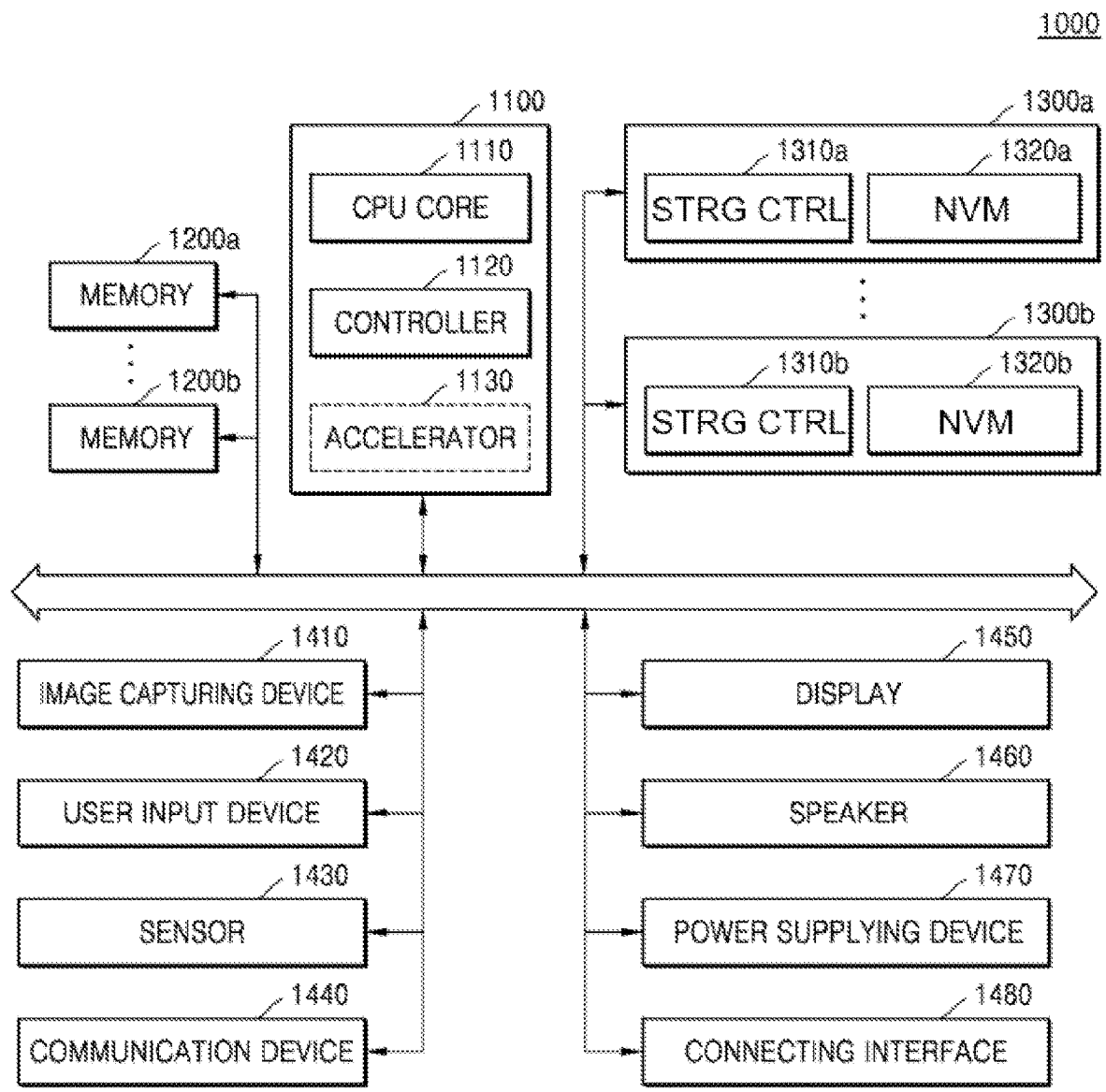
FIG. 14 is a diagram showing a system to which a storage device according to an embodiment of the invention is applied.

FIG. 14 is a diagram showing a system to which a storage device according to an embodiment of the invention is applied.

A system 1000 of FIG. 14 may be, for example, a mobile system, such as a mobile phone, a smart phone, a tablet PC (tablet personal computer), a wearable device, a healthcare device or an IOT (internet of things) device. However, the system 1000 of FIG. 14 is not necessarily limited to a mobile system, but may also be a personal computer, a laptop computer, a server, a media player or an automotive device such as a navigation.

Referring to FIG. 14, the system 1000 may include a main processor 1100, memories 1200a and 1200b, and storage devices 1300a, 1300b, and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control the overall operations of the system 1000, more specifically, the operations of other components that make up the system 1000. Such a main processor 1100 may be implemented as a general purpose processor, a dedicated processor, an application processor, or the like.

The main processor 1100 may include one or more CPU cores 1110, and may further include a controller 1120 for controlling the memories 1200a and 1200b and/or the storage devices 1300a and 1300b. Depending on the embodiments, the main processor 1100 may further include an accelerator block 1130, which is a dedicated circuit for a high-speed data computation such as an AI (artificial intelligence) data computation. Such an accelerator block 1130 may include a GPU (Graphics Processing Unit), an NPU (Neural Processing Unit) and/or a DPU (Data Processing Unit), and the like, and may be implemented as separate chips that are physically independent of other components of the main processor 1100.

The memories 1200a and 1200b may be used as a main memory unit of the system 1000, and may include a volatile memory such as an SRAM and/or a DRAM, but may also include a non-volatile memory such as a flash memory, a PRAM and/or a RRAM. The memories 1200a and 1200b may also be implemented in the same package as the main processor 1100.

The storage devices 1300a and 1300b may function as non-volatile storage devices for storing data regardless of whether a power is supplied, and may have a relatively larger capacity than the memories 1200a and 1200b. The storage devices 1300a and 1300b may include storage controllers 1310a and 1310b, and non-volatile (non-volatile memory (NVM) storages 1320a and 1320b that store data under the control of the storage controllers 1310a and 1310b. The non-volatile memories 1320a and 1320b may include a V-NAND flash memory of a 2D (2-dimensional) structure or a 3D (3-dimensional) structure, but may also include other types of non-volatile memory such as a PRAM and/or a RRAM.

The storage devices 1300a and 1300b may be included in the system 1000 in a state of being physically separated from the main processor 1100, and may be implemented in the same package as the main processor 1100. Further, since the storage devices 1300a and 1300b have a shape such as an SSD (solid state device) or a memory card, the storage devices 1300a and 1300b may also be detachably coupled with other constituent elements of the system 1000 through an interface such as a connecting interface 1480 to be described below. Such storage devices 1300a and 1300b may be, but not necessarily limited to, devices to which standard protocols such as a UFS (universal flash storage), an eMMC (embedded multi-media card) or an NVMe (non-volatile memory express) are applied.

The image capturing device 1410 may capture still images or moving images, and may be a camera, a camcorder, and/or a webcam and the like.

The user input device 1420 may receive various types of data that are input from users of the system 1000, and may be a touch pad, a key pad, a key board, a mouse and/or a microphone.

The sensor 1430 may detect various types of physical quantities that may be acquired from the outside of the system 1000, and convert the detected physical quantities into electrical signals. Such a sensor 1430 may be a temperature sensor, a pressure sensor, an illuminance sensor, a position sensor, an acceleration sensor, a biosensor and/or a gyroscope sensor.

The communication device 1440 may transmit and receive signals to and from other devices outside the system 1000 according to various communication protocols. Such a communication device 1440 may be implemented to include an antenna, a transceiver and/or a modem and the like.

The display 1450 and the speaker 1460 may each function as output devices that output visual and auditory information to the user of the system 1000.

The power supplying device 1470 may appropriately convert the power supplied from a battery (not shown) equipped in the system 1000 and/or an external power source, and supply the power to each constituent element of the system 1000.

The connecting interface 1480 may provide a connection between the system 1000 and an external device that may be connected to the system 1000 to transmit and receive data to and from the system 1000. The connecting interface 1480 may be implemented by various interface types, such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), an SD (secure digital) card, a MMC (multi-media card), an eMMC (embedded multi-media card), a UFS (Universal Flash Storage), an eUFS (embedded Universal Flash Storage), and a CF (compact flash) card interface.

Although the embodiments of the present invention have been described above with reference to the accompanying drawings, the present invention is not limited to the above embodiments, and may be fabricated in various forms. Those skilled in the art will appreciate that the present invention may be embodied in other specific forms without changing the technical spirit or essential features of the present invention. Accordingly, the above-described embodiments should be understood in all respects as illustrative and not restrictive.

What is claimed is:
1. A storage device comprising:
a non-volatile memory device including a plurality of physical blocks, each physical block includes a plurality of sub-blocks; and
a storage controller including a free block list and a victim selectable block list for the plurality of physical blocks, the storage controller configured to manage addresses of the physical blocks and the sub-blocks of the non-volatile memory device based on the free block list and the victim selectable block list,
wherein the storage controller is configured to check groups of physical blocks sorted in the free block list and select a head of one of the groups of the physical blocks capable of processing a write request received from a host when there are not enough free blocks for storing data in response to the write request,
wherein the storage controller is configured to perform a garbage collection based on the victim selectable block list and to transmit an address of the physical block subjected to the garbage collection to the non-volatile memory device together with the write request when there are no full reusable physical blocks,
wherein the free block list is a block list which is arranged by
sorting the plurality of physical blocks in a first order, and grouping the sorted plurality of physical blocks into a plurality of different groups based on the first order, and wherein the free block list is a list to store the sorted plurality of physical blocks in the storage controller by a connected list structure, based on free block information which includes a head of each of the plurality of different groups according to the first order.

2. The storage device of claim 1,
wherein the first order is based on a ratio of invalid sub-blocks among the plurality of sub-blocks, and
wherein the free block list is further arranged by sorting at least two physical blocks belonging to the plurality of different groups in a second order, based on an erase count of each of the grouped plurality of physical blocks.

3. The storage device of claim 2,
wherein the free block information further includes an erase count of the physical blocks, and a page valid state of the sub-blocks.

4. The storage device of claim 2, wherein the storage controller is configured to,
call the free block list upon receiving the write request,
check the head of each of the plurality of different groups grouped according to the first order in the free block list,
select a head of one of the plurality of different groups according to the free block list,
return an address of a physical block corresponding to the write request among the physical blocks corresponding to the selected head, and
transmit the address to the non-volatile memory device.

5. The storage device of claim 4,
wherein when there is a first group including only invalid sub-blocks among the plurality of different groups, the storage controller is configured to select a first head of a first physical block belonging to the first group.

6. The storage device of claim 5,
wherein the storage controller is configured to select a head of a second physical block, belonging to one of the plurality of different groups other than the first group, that includes at least one valid sub-block, when the first physical block is absent.

7. The storage device of claim 1, wherein the victim selectable block list is a block list which is arranged by
sorting the plurality of physical blocks in a third order based on a ratio of invalid sub-blocks among the plurality of sub-blocks,
grouping the sorted plurality of physical blocks into a plurality of different groups based on the ratio of invalid sub-blocks among the plurality of sub-blocks, and
sorting at least two physical blocks belonging to the plurality of different groups in a fourth order, based on each valid page count of the physical blocks grouped in the third order.

8. The storage device of claim 7, wherein the victim selectable block list is a list to store a plurality of physical blocks in the storage controller by a connected list structure, based on victim block information including the head of each of the plurality of different groups according to the third order, a valid page count of the physical blocks, and a page valid state of the sub-blocks.

9. A storage device comprising:
a non-volatile memory device including a plurality of physical blocks divided into a plurality of sub-blocks; and
a storage controller configured to control driving of the non-volatile memory device,
wherein the storage controller comprises,
a write module configured to, upon receiving a write request of a host, request an address of a free block according to the write request;
a garbage collector configured to request an address of a victim block for performing a garbage collection; and
a block manager configured to store a free block list and a victim selectable block list, and select and return the address of a physical block capable of processing the write request based on the free block list or the address of at least one of the physical blocks sorted in the victim selectable block list corresponding to a request of the garbage collector,
wherein the free block list is a physical block list which is arranged by
sorting the plurality of physical blocks in a first writing order based on a number of invalid sub-blocks among the plurality of sub-blocks, and
grouping the sorted plurality of physical blocks into a plurality of different groups based on the first writing order, and
wherein the free block list is a list to store the sorted plurality of physical blocks in the storage controller by a connected list structure, based on free block information which includes a head of each of the plurality of different groups according to the first writing order.

10. The storage device of claim 9, wherein the
first writing order lists a number of invalid sub-blocks among the plurality of sub-blocks from large to small, and
wherein the free block list is further arranged by sorting the plurality of physical blocks in a second writing order in-which lists an erase count among the plurality of physical blocks from small to large.

11. The storage device of claim 9, wherein the block manager is configured to:
check a full reusable physical block in the free block list corresponding to a request of the write module,
when there is a first physical block including full reusable sub-blocks, select a first head of a group to which the first physical block belongs and the first physical block corresponding to the first head, and
return an address of the first physical block to the write module.

12. The storage device of claim 11, wherein the block manager is configured to:
select a second head of a group to which a second physical block including at least one valid sub-block belongs, when there is no full reusable first physical block, and
select an address of a second physical block, among a plurality of second physical blocks corresponding to the second head, that corresponds to the request of the write module.

13. The storage device of claim 12,
wherein when there is no physical block belonging to the second head, the block manager requests the garbage collector to request the victim block from the victim selectable block list.

14. The storage device of claim 9, wherein the block manager is configured to:
check the victim block belonging to a first rank group in the victim selectable block list corresponding to a request of the garbage collector, select a head of the first rank group when selectable within the first rank group, and return an address of a third physical block having victim block information corresponding to the request of the garbage collector among third physical blocks corresponding to the head to the garbage collector.

15. The storage device of claim 14, wherein the victim selectable block list is a physical block list which is arranged by, sorting and grouping in a first victim order in which a number of valid sub-blocks among the plurality of sub-blocks is small to large, and sorting in a second victim order in which an effective page count among the grouped physical blocks is small to large.

16. A method of operating a storage controller, the method comprising:

receiving a write request from a host to write data to a non-volatile memory device including a plurality of physical blocks, the physical blocks include a plurality of sub-blocks;

checking, in response to the write request, whether there is a full reusable first physical block capable of storing data in a free block list;

selecting a head of a first group among the plurality of different groups, to which the full reusable first physical block belongs, and returning a free block address including the head of the first group to a non-volatile memory device, when there is a full reusable first physical block;

selecting a head of a second group among the plurality of different groups when there is no full reusable first physical block, wherein each physical block in the second group includes at least one valid sub-block, and returning an address of a second physical block corresponding to the head of the second group, the second physical block having enough capacity to store the data; and transmitting the write request together with one of the free block address and the address of the second physical block corresponding to the head of the second group to the non-volatile memory device, wherein the free block list includes a plurality of physical blocks which are sorted and grouped into a plurality of different groups based on a first writing order and connected by a list structure based on free block information which includes a head of each of the plurality of different groups.

17. The method of operating the storage controller of claim 16, wherein when the second physical block corresponding to the head of the second group does not have enough capacity to store the data to be written, the returning the address of the second physical block corresponding to the head of the second group is configured to:

start a garbage collection;

select a victim block in a victim selectable block list based on the data to be written, when the garbage collection starts;

perform the garbage collection on the selected victim block and switch garbage collected victim block to a free block; and return an address of the switched free block.

18. The method of operating the storage controller of claim 16, wherein the first writing order lists a number of invalid sub-blocks among the plurality of sub-blocks from large to small, and wherein the free block list is further arranged by sorting the plurality of physical blocks in a second writing order which lists an erase count between the grouped physical blocks from small to large.

19. The method of operating the storage controller of claim 18, wherein the free block information further includes an erase count of the physical blocks, and a page valid state of the sub-blocks.

20. The method of operating the storage controller of claim 17, wherein the victim selectable block list is a physical block list which is arranged by sorting and grouping in a first victim order in which a number of valid sub-blocks among the plurality of sub-blocks is listed from small to large, and sorting in a second victim order in which an effective page count among the grouped physical blocks is listed from small to large.

21. The method of operating the storage controller of claim 20, wherein the victim selectable block list is a list to store a plurality of physical blocks in the storage controller by a connected list structure, based on victim block information including a head of a group according to the first victim order, a valid page count of the physical blocks, and a page valid state of the sub-blocks.

22. The storage device of claim 1, wherein the storage controller includes a flash translation layer, and wherein the flash translation layer stores the free block list and the victim selectable block list.

23. The storage device of claim 1, wherein the physical blocks and the sub-blocks are units of an erase operation.

* * * * *